United States Patent [19]
Kawahata et al.

[11] Patent Number: 6,126,248
[45] Date of Patent: Oct. 3, 2000

[54] HYDRAULIC BRAKE DEVICE

[75] Inventors: Fumiaki Kawahata, Toyota; Masayasu Ohkubo, Okazaki, both of Japan

[73] Assignee: Toyota Jidosha Kabushiki Kaisha, Toyota, Japan

[21] Appl. No.: 09/122,625

[22] Filed: Jul. 27, 1998

[30] Foreign Application Priority Data

Aug. 8, 1997 [JP] Japan .................................. 9-215010

[51] Int. Cl.⁷ ...................................................... B60T 8/44
[52] U.S. Cl. ..................... 303/114.1; 303/116.1; 303/117.1; 303/119.1
[58] Field of Search .............. 303/119.1, 113.1, 303/114.1, 115.4, 116.1, 117.1

[56] References Cited

U.S. PATENT DOCUMENTS

| | | | |
|---|---|---|---|
| 4,869,560 | 9/1989 | Nishii | 303/114.1 |
| 4,877,296 | 10/1989 | Leiber et al. | 303/115.4 |
| 5,061,016 | 10/1991 | Hirobe | 303/114.1 |
| 5,171,072 | 12/1992 | Maehara | 303/114.1 |
| 5,462,343 | 10/1995 | Yoshida et al. | 303/114.1 |

FOREIGN PATENT DOCUMENTS

| | | |
|---|---|---|
| 0 469 978 A2 | 2/1992 | European Pat. Off. . |
| 4-221258 | 8/1992 | Japan . |
| WO 93/09012 | 5/1993 | WIPO . |

Primary Examiner—Robert J. Oberleitner
Assistant Examiner—Mariano Sy
Attorney, Agent, or Firm—Oliff & Berridge, PLC

[57] ABSTRACT

In a hydraulic brake device, a pressurizing chamber receives a master cylinder pressure generated by a master cylinder. A pressure adjusting chamber receives an accumulator pressure generated by a high pressure source. A booster piston is movably provided between the pressurizing chamber and the pressure adjusting chamber. The booster piston is actuated in a first direction away from the pressurizing chamber by a pressure in the pressurizing chamber and actuated in a direction opposite to the first direction by a pressure in the pressure adjusting chamber. A flow control mechanism responsive to a movement of the booster piston is provided. The flow control mechanism makes the pressure adjusting chamber open to the high pressure source when the booster piston is moved in the first direction exceeding a predetermined distance, and closes the pressure adjusting chamber to be cut off from the high pressure source when the booster piston is moved in the opposite direction back to an initial position. The hydraulic brake device allows a boosted pressure in the pressure adjusting chamber to be produced based on the accumulator pressure when a malfunction in an electrical system is detected, and supplies the boosted pressure into a wheel cylinder.

12 Claims, 4 Drawing Sheets

HYDRAULIC BRAKE DEVICE

BACKGROUND OF THE INVENTION (1) Field of the Invention

The present invention relates to a hydraulic brake device which functions to ensure an appropriate control of brake fluid pressure in a hydraulic circuit connected to wheels of an automotive vehicle.

(2) Description of the Related Art

As disclosed in Japanese Laid-Open Patent Application No. 4-221258, there is known a hydraulic brake device that electrically controls a brake fluid pressure supplied into a wheel cylinder. Such a hydraulic brake device is provided with a master cylinder which generates a brake fluid pressure (hereinafter called the master cylinder pressure $P_{M/C}$), and a high pressure source which generates a boosted brake fluid pressure (hereinafter called the accumulator pressure) which is higher than the master cylinder pressure $P_{M/C}$.

The master cylinder generates the master cylinder pressure $P_{M/C}$ in response to a brake pedal pressure exerted on a brake pedal by a vehicle operator. Hence, a braking force that is proportional to the brake pedal pressure is exerted on a wheel by the wheel cylinder when the master cylinder pressure $P_{M/C}$ is supplied into the wheel cylinder. The high pressure source generates the accumulator pressure which is higher than the master cylinder pressure $P_{M/C}$. Hence, an increased braking force that is higher than the brake pedal pressure is exerted on the wheel by the wheel cylinder when the accumulator pressure is supplied into the wheel cylinder. In the latter case, the operator can perform the braking operation more easily than in the former case to effect the braking force on the vehicle.

In the conventional device of the above-mentioned publication, when the hydraulic brake device is operating normally, an electrical brake control is performed so that the master cylinder is separated or cut off from the wheel cylinder and the high pressure source is brought in line with the wheel cylinder. The accumulator pressure from the high pressure source is supplied into the wheel cylinder. In such a configuration, it is possible for the wheel cylinder to exert a large braking force on the vehicle wheel in comparison with the brake pedal pressure. According to the electrical brake control, the wheel cylinder pressure of the wheel cylinder is set at the accumulator pressure.

When a malfunction in the conventional device of the above publication is detected, the electrical brake control is switched to a manual operation mode so that the high pressure source is separated or cut off from the wheel cylinder and the master cylinder is brought in line with the wheel cylinder. The master cylinder pressure $P_{M/C}$ from the master cylinder is supplied into the wheel cylinder. In such a configuration, when the operator manually exerts the brake pedal pressure on the brake pedal, it is possible for the wheel cylinder to exert a braking force which is approximately equal to the master cylinder pressure $P_{M/C}$. Hence, although the malfunction has occurred, the wheel cylinder pressure of the wheel cylinder is set to be almost equal to the master cylinder pressure $P_{M/C}$ by the manual operation of the operator.

However, in the conventional device of the above publication, when the high pressure source is operating normally but a malfunction in a sensor of an electrical system is detected, the electrical brake control is stopped and the switching to the manual operation mode is performed so that the high pressure source is cut off from the wheel cylinder, and the master cylinder is connected with the wheel cylinder. Only the master cylinder pressure $P_{M/C}$ from the master cylinder is supplied into the wheel cylinder. In such a configuration, the accumulator pressure from the high pressure source cannot be supplied into the wheel cylinder even if the high pressure source is operating normally. The level of the braking force exerted on the wheel in such a case is proportional to the brake pedal pressure on the brake pedal by the operator. In order to exert a large braking force on the wheel, the vehicle operator must depress the brake pedal very heavily.

Practically, there exist many cases in which the accumulator pressure from the high pressure source can be utilized to exert an increased braking force on the vehicle wheel even when a malfunction in an electrical system is detected. However, the conventional device of the above publication does not supply the accumulator pressure from the high pressure source into the wheel cylinder when a malfunction in the electrical system is detected. It is difficult for the conventional device of the above publication to ensure an appropriate control of the brake fluid pressure when such a malfunction is detected.

SUMMARY OF THE INVENTION

An object of the present invention is to provide an improved hydraulic brake device in which the above-described problems are eliminated.

Another object of the present invention is to provide a hydraulic brake device which effectively uses an accumulator pressure supplied by the high pressure source when a malfunction in the electrical system is detected but the high pressure source is operating normally, so that the wheel cylinder safely exerts an adequately large braking force on the vehicle wheel.

The above-mentioned object of the present invention is achieved by a hydraulic brake device comprising: a master cylinder which generates a master cylinder pressure in response to a brake pedal pressure; a high pressure source which generates an accumulator pressure higher than the master cylinder pressure; an electrical system which electrically controls a brake fluid pressure supplied to a wheel cylinder based on the accumulator pressure supplied from the high pressure source into the wheel cylinder; a pressurizing chamber, connected to the master cylinder, which receives the master cylinder pressure generated by the master cylinder; a pressure adjusting chamber, connected to the high pressure source, which receives the accumulator pressure generated by the high pressure source; a booster piston movably provided between the pressurizing chamber and the pressure adjusting chamber, the booster piston being actuated in a first direction away from the pressurizing chamber by a pressure in the pressurizing chamber, the booster piston being actuated in a direction opposite to the first direction by a pressure in the pressure adjusting chamber; and a flow control mechanism, responsive to a movement of the booster piston, which makes the pressure adjusting chamber open to the high pressure source when the booster piston is moved in the first direction exceeding a predetermined distance, and closes the pressure adjusting chamber to be cut off from the high pressure source when the booster piston is moved in the opposite direction back to an initial position. The hydraulic brake device allows a boosted pressure in the pressure adjusting chamber to be produced based on the accumulator pressure when a malfunction in the electrical system is detected, and supplies the boosted pressure from the pressure adjusting chamber into the wheel cylinder.

In the hydraulic brake device of the present invention, when a malfunction in the electrical system is detected but the high pressure source is operating normally, it is possible to effectively supply the accumulator pressure through the pressure adjusting chamber into the wheel cylinder so that the wheel cylinder exerts an adequately large braking force on the vehicle wheel.

In the hydraulic brake device of the present invention, the booster piston includes a through hole provided therein which connects the pressuring chamber with the pressure adjusting chamber. Hence, if a malfunction in the high pressure source has occurred, it is possible to supply the master cylinder pressure into the wheel cylinder through the through hole of the booster piston. Further, in the hydraulic brake device of the present invention, a check valve is provided in the brake fluid path between the high pressure source and the pressure adjusting chamber to allow the flow of brake fluid in the direction from the high pressure source to the pressure adjusting chamber but inhibit the flow of brake fluid in the opposite direction. Hence, if a malfunction in the high pressure source has occurred, it is possible to prevent the master cylinder pressure from escaping from the pressure adjusting chamber into the high pressure source.

BRIEF DESCRIPTION OF THE DRAWINGS

The above and other objects, features and advantages of the present invention will become more apparent from the following detailed description when read in conjunction with the accompanying drawings in which.

DESCRIPTION OF THE PREFERRED EMBODIMENTS

A description will now be given of the preferred embodiments of the present invention with reference to the accompanying drawings.

Figure 1:
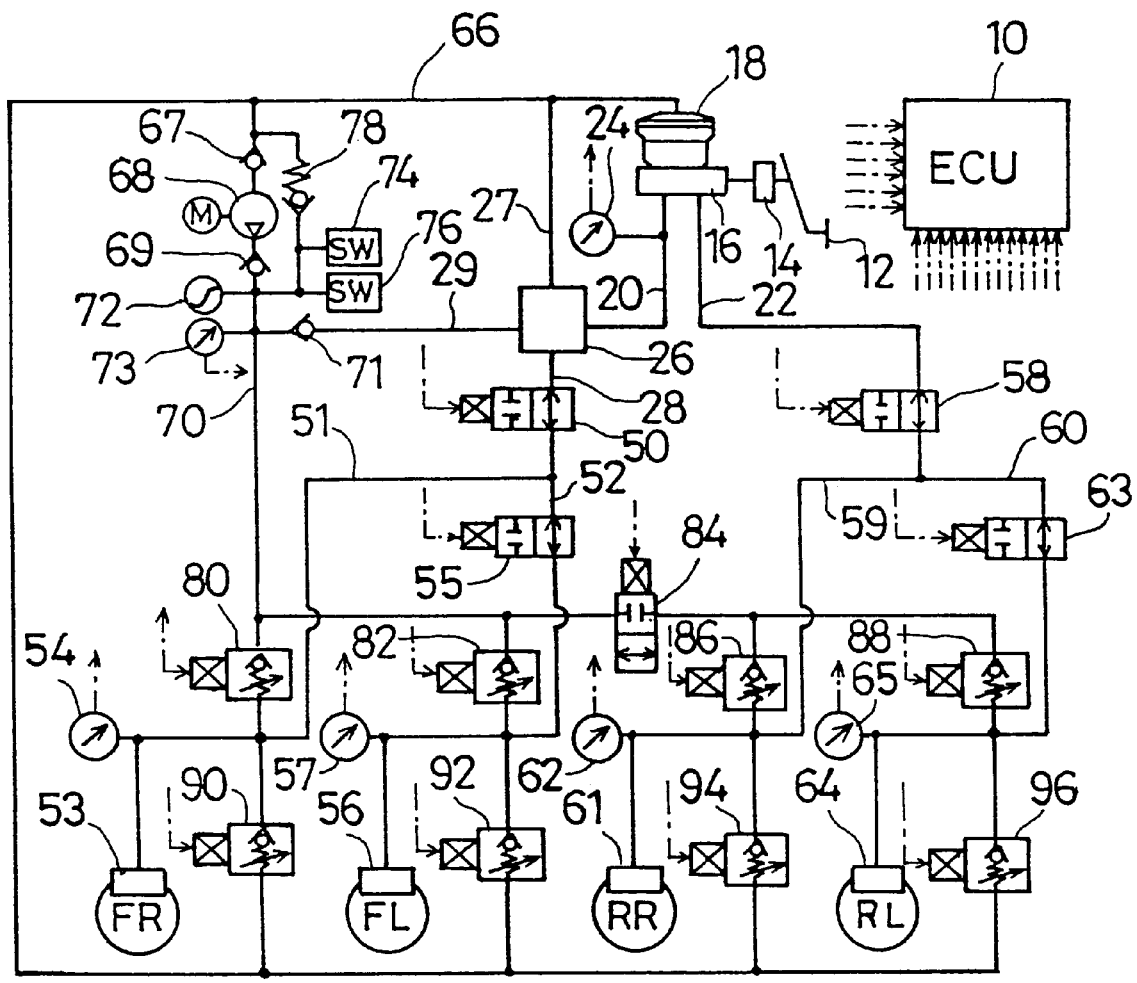
FIG. 1 is a block diagram of a first embodiment of a hydraulic brake device of the present invention.

FIG. 1 shows a first embodiment of a hydraulic brake device of the present invention. The hydraulic brake device is provided with an electronic control unit 10 (hereinafter called ECU 10). The ECU 10 controls the overall operation of the hydraulic brake device.

As shown in FIG. 1, the hydraulic brake device is provided with a brake pedal 12 of an automotive vehicle. The brake pedal 12 is connected to a master cylinder 16 via a stroke simulator 14. The stroke simulator 14 produces a stroke of the brake pedal 12 in response to a brake pedal pressure exerted on the brake pedal 12 by a vehicle operator. The master cylinder 16 is provided with two internal pressure chambers therein and generates a master cylinder pressure $P_{M/C}$ in the internal pressure chambers in response to the brake pedal pressure exerted on the brake pedal 12.

A reservoir tank 18 is provided at an upper portion of the master cylinder 16. The reservoir tank 18 is filled with brake fluid. When the brake pedal 12 is released, the reservoir tank 18 is open to the internal pressure chambers of the master cylinder 16.

A first hydraulic path 20 and a second hydraulic path 22 are connected to the master cylinder 16. A master cylinder pressure sensor 24 (hereinafter called $P_{M/C}$ sensor 24) is connected to the first hydraulic path 20 in which the master cylinder pressure $P_{M/C}$ from the master cylinder 16 is supplied. The $P_{M/C}$ sensor 24 outputs a signal (hereinafter called output signal pMC) indicative of the master cylinder pressure $P_{M/C}$ of the first hydraulic path 20. The output signal pMC of the $P_{M/C}$ sensor 24 is supplied to the ECU 10. The ECU 10 detects the master cylinder pressure $P_{M/C}$ based on the output signal pMC of the $P_{M/C}$ sensor 24.

The first hydraulic path 20 is connected at the other end to a mechanical pressure-increase valve 26. Further, an atmosphere path 27, a front hydraulic path 28 and a pump pressure path 29 are connected to the mechanical pressure-increase valve 26. The atmosphere path 27 is connected to the reservoir tank 18 and open to the atmosphere via the reservoir tank 18. The mechanical pressure-increase valve 26 boosts a brake fluid pressure and supplies the boosted pressure into the front hydraulic path 28. An accumulator pressure Pacc that is higher than the master cylinder pressure $P_{M/C}$ is supplied through the pump pressure path 29 to the mechanical pressure-increase valve 26, which will be described later.

Figure 2:
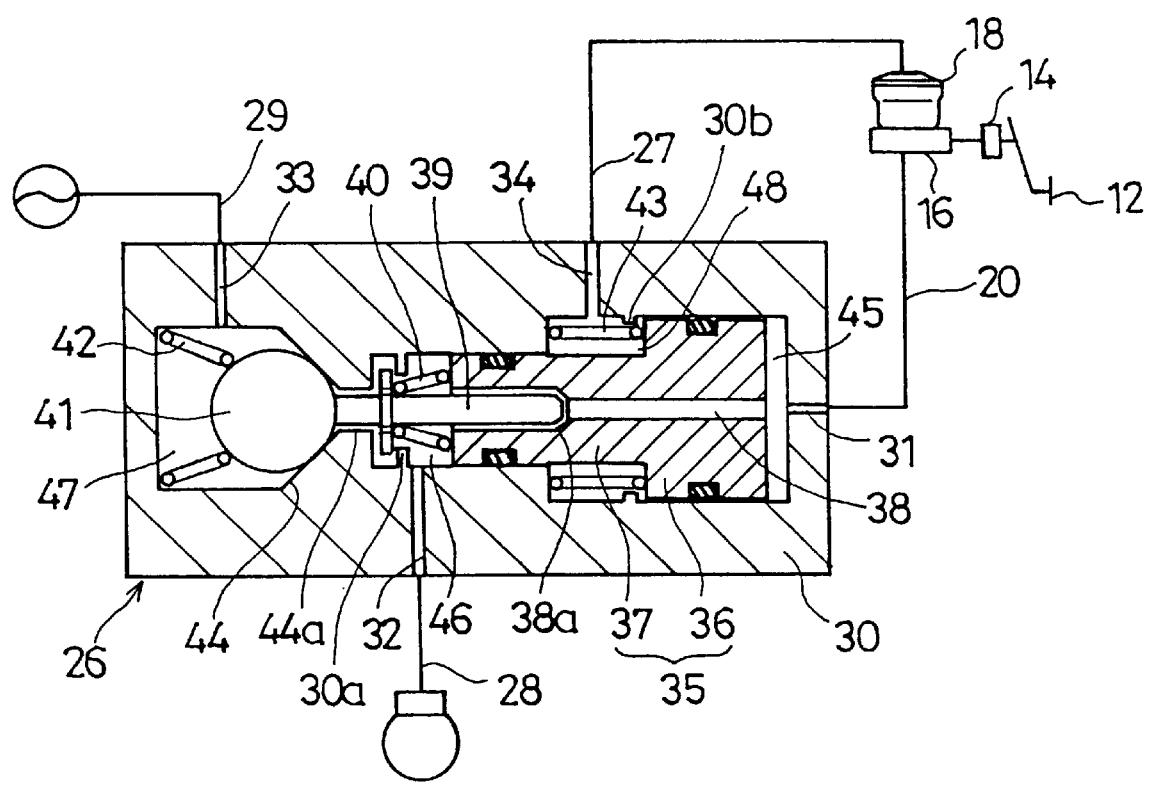
FIG. 2 is a cross-sectional view of a mechanical pressure-increase valve in the hydraulic brake device of FIG. 1.

FIG. 2 shows a mechanical pressure-increase valve 26 in the hydraulic brake device of FIG. 1.

As shown in FIG. 2, the mechanical pressure-increase valve 26 is provided with a housing 30. In the housing 30, a master cylinder pressure port 31 connected to the first hydraulic path 20, a discharge port 32 connected to the front hydraulic path 28, a high pressure port 33 connected to the pump pressure path 29, and an atmosphere port 34 connected to the atmosphere path 27 are formed.

A booster piston 35 is movably provided within the housing 30 of the mechanical pressure-increase valve 26. In the booster piston 35, a large-diameter portion 36 having a large cross-sectional area "S" and a small-diameter portion 37 having a small cross-sectional area "s" are formed. A through hole 38 extending along a central axis of the booster piston 35 is formed inside the booster piston 35. A needle valve 39 is placed into the through hole 38. A valve seat 38a which serves as a valve seat of the needle valve 39 is formed in the through hole 38. A first spring 40 is provided between the needle valve 39 and the booster piston 35. The first spring 40 exerts an actuating force on the needle valve 39 to separate the needle valve 39 from the valve seat 38a.

Further, in the mechanical pressure-increase valve 26, a ball valve 41, a second spring 42, and a third spring 43 are provided within the housing 30. A valve seat 44 which serves as a valve seat of the ball valve 41 is formed in the housing 30. The second spring 42 exerts an actuating force on the ball valve 41 to push the ball valve 41 toward the valve seat 44. The third spring 43 exerts an actuating force on the booster piston 35 to push the booster piston 35 toward the master cylinder pressure port 31. A through hole 44a in which the needle valve 39 is passed is formed at the center of the valve seat 44.

In the housing 30 of the mechanical pressure-increase valve 26, a pressurizing chamber 45, a pressure adjusting chamber 46, a high pressure chamber 47, and a drain chamber 48 are formed by the booster piston 35 and the ball valve 41. The pressurizing chamber 45 is connected to the master cylinder 16 via the master cylinder pressure port 31. The pressure adjusting chamber 46 is connected to the front hydraulic path 28 via the discharge port 32. The high pressure chamber 47 is connected to the high pressure source via the high pressure port 33. The drain chamber 48 is connected to the reservoir tank 18 via the atmosphere port 34.

Further, in the housing 30, a stopper 30a and a stopper 30b are formed. The stopper 30a is provided on an inside wall of the pressure adjusting chamber 46 to limit a displacement of the needle valve 39 relative to the housing 30. The stopper 30b is provided on an inside wall of the drain chamber 48 to limit a displacement of the booster piston 35 relative to the housing 30. When the needle valve 39 contacts the stopper 30a, a movement of the needle valve 39 relative to the housing 30 in the right-hand direction of FIG. 2 is inhibited by the stopper 30a. When the booster piston 35 contacts the stopper 30b, a movement of the booster piston 35 relative to the housing 30 in the left-hand direction of FIG. 2 is inhibited by the stopper 30b.

Next, an operation of the mechanical pressure-increase valve 26 will be described with reference to FIG. 2.

When no master cylinder pressure $P_{M/C}$ is generated by the master cylinder 16, the mechanical pressure-increase valve 26 is maintained in an initial condition as shown in FIG. 2. In the initial condition, when the vehicle operator starts depressing the brake pedal 12, the brake fluid is supplied into the pressurizing chamber 45 from the master cylinder pressure port 31. The brake fluid in the pressurizing chamber 45 is supplied through the through hole 38 into the pressure adjusting chamber 46. Hence, after the brake pedal 12 is depressed, both the internal pressure of the pressurizing chamber 45 and the internal pressure of the pressure adjusting chamber 46 are increased to the master-cylinder pressure $P_{M/C}$.

When the master cylinder pressure $P_{M/C}$ is produced in both the pressurizing chamber 45 and the pressure adjusting chamber 46, an actuating force F, which is represented by the formula $F = S \cdot P_{M/C} - s \cdot P_{M/C}$ where S is the cross-sectional area of the large-diameter portion 36 and s is the cross-sectional area of the small-diameter portion 37, is exerted on the booster piston 35, and the actuating force F functions to push the booster piston 35 toward the pressure adjusting chamber 46. Consequently, the booster piston 35 starts moving toward the pressure adjusting chamber 46 relative to the housing 30 promptly after the brake pedal 12 is depressed.

When the booster piston 35 is moved toward the pressure adjusting chamber 46 exceeding a predetermined distance, the needle valve 39 abuts on the valve seat 38a to close the through hole 38. After the through hole 38 is closed by the needle valve 39, the actuating force F exerted on the booster piston 35 begins to be transmitted to the ball valve 41 through the needle valve 39. Hence, shortly after the movement of the booster piston 35 exceeds the distance, the ball valve 41 is separated from the valve seat 44 to open the through hole 44a by the actuating force F.

When the ball valve 41 is separated from the valve seat 44, the pressure adjusting chamber 46 is open to the high pressure chamber 47. Hence, shortly after the ball valve 41 is set in the valve open state, the internal pressure of the pressure adjusting chamber 46 is higher than the master cylinder pressure $P_{M/C}$. Suppose that Pc denotes a brake fluid pressure produced in the pressure adjusting chamber 46 in such a condition. An actuating force F1 exerted on the booster piston 35 in such a condition is represented by the formula $F1 = S \cdot P_{M/C} - s \cdot Pc$. If the actuating force F1 is a positive value, or greater than zero, the booster piston 35 is kept to be moved in the valve open direction to further separate the ball valve 41 from the valve seat 44.

If the brake fluid pressure Pc of the pressure adjusting chamber 46 becomes adequately high, the actuating force F1 on the booster piston 35 is a negative value, or smaller than zero. The booster piston 35 starts being moved in the valve closing direction to bring the ball valve 41 into contact with the valve seat 44. When the ball valve 41 abuts on the valve seat 44, the pressure Pc of the pressure adjusting chamber 46 stops being increased.

In the mechanical pressure-increase valve 26 of FIG. 2, the above-described operation is carried out after the brake pedal 12 is depressed by the vehicle operator. The mechanical pressure-increase valve 26 of the present embodiment is arranged such that the internal pressure of the pressure adjusting chamber 46 is controlled to a boosted pressure Pb after the above-described operation is performed. The boosted pressure Pb is represented by the formula $Pb = (S/s) \cdot P_{M/C}$. Hereinafter, the coefficient (S/s) of the formula is called the boost ratio S/s.

The mechanical pressure-increase valve 26 of the present embodiment boosts the brake fluid pressure of the pressure adjusting chamber 46 in accordance with the formula $Pb = (S/s) \cdot P_{M/C}$, and supplies the boosted pressure Pb to the front hydraulic path 28 from the discharge port 32. As is apparent from the above-mentioned formula, the boosted pressure Pb supplied to the front hydraulic path 28 is equal to the master cylinder pressure $P_{M/C}$ multiplied by the boost ratio S/s.

According to the mechanical pressure-increase valve 26 of the present embodiment, when the brake pedal 12 is depressed, it is possible to supply the boosted pressure Pb into the front hydraulic path 28, the boosted pressure Pb being equal to the master cylinder pressure $P_{M/C}$ multiplied by the boost ratio S/s.

In the mechanical pressure-increase valve 26 of the present embodiment, when a proper-accumulator pressure Pacc is not supplied into the high pressure chamber 47 through the pump pressure path 29, only the second spring 42 exerts the actuating force on the ball valve 41 to push the ball valve 41 toward the valve seat 44. The actuating force on the ball valve 41 by the second spring 42 is preset to be smaller than the actuating force on the needle valve 39 by the first spring 40. In such a condition, when the booster piston 35 is moved toward the pressure adjusting chamber 46 after the brake pedal 12 is depressed by the operator, the needle valve 39 does not abut on the valve seat 38a to close the through hole 38, but the ball valve 41 is separated from the valve seat 44 to open the through hole 44a. The booster piston 35 is continuously moved toward the pressure adjusting chamber 46 until the booster piston 35 contacts the stopper 30b. During the movement of the booster piston 35, the needle valve 39 is continuously set in the valve open state to open the through hole 38.

Accordingly, when the internal pressure of the high pressure chamber 47 is not increased to a proper accumulator pressure Pacc, the internal pressure of the pressure adjusting chamber 46 is kept to be equal to the master cylinder pressure $P_{M/C}$ after the brake pedal 12 is depressed by the operator. According to the mechanical pressure-increase valve 26 of the present embodiment, after the brake pedal 12 is depressed, it is possible to supply the brake fluid pressure of the pressure adjusting chamber 46 into the front hydraulic path 28, the pressure of the pressure adjusting chamber 46 being equal to the master cylinder pressure $P_{M/C}$.

In the mechanical pressure-increase valve 26 of the present embodiment, when the master cylinder pressure $P_{M/C}$ is produced in the pressure adjusting chamber 46 in the above-described manner, the master cylinder pressure $P_{M/C}$ in the pressure adjusting chamber 46 is also supplied into the pump pressure path 29 through the high pressure chamber 47.

Referring back to FIG. 1, in the hydraulic brake device of the present embodiment, the front hydraulic path 28 is connected at the other end to a front right main cut valve 50 (hereinafter called FMCV 50). The FMCV 50 is a two-position solenoid valve which is set in a valve open state in an initial condition, and set in a valve closed state when a drive signal is supplied to the FMCV 50 by the ECU 10. Hereinafter, the condition in which the FMCV 50 is set in the valve open state with no drive signal supplied to the FMCV 50 is called the initial condition.

The FMCV 50 is connected at the other end to both a front right connecting path 51 (hereinafter called FR connecting path 51) and a front left connecting path 52 (hereinafter called FL connecting path 52). That is, the output of the FMCV 50 branches into the FR connecting path 51 and the FL connecting path 52.

The FR connecting path 51 is connected to a wheel cylinder 53, and the wheel cylinder 53 is provided in a front right (FR) wheel of the vehicle. An FR pressure sensor 54 is connected to an intermediate portion of the FR connecting path 51 adjacent to the wheel cylinder 53. The FR pressure sensor 54 outputs a signal (hereinafter called output signal pFR) indicative of a wheel cylinder pressure $P_{W/C}$ of the wheel cylinder 53. The output signal pFR of the FR pressure sensor 54 is supplied to the ECU 10. The ECU 10 detects the wheel cylinder pressure $P_{W/C}$ related to the FR wheel based on the output signal pFR of the FR pressure sensor 54.

The FL connecting path 52 is connected to a front sub-cut valve 55 (hereinafter called FSCV 55). The FSCV 55 is a two-position solenoid valve which is set in a valve open state in an initial condition, and set in a valve closed state when a drive signal is supplied to the FSCV 55 by the ECU 10. Hereinafter, the condition in which the FSCV 55 is set in the valve open state with no drive signal supplied to the FSCV 55 is called the initial condition.

The FSCV 55 is connected to a wheel cylinder 56, and the wheel cylinder 56 is provided in a front left (FL) wheel of the vehicle. An FL pressure sensor 57 is connected to an intermediate portion of the FL connecting path 52 adjacent to the wheel cylinder 56. The FL pressure sensor 57 outputs a signal (hereinafter called output signal pFL) indicative of a wheel cylinder pressure $P_{W/C}$ of the wheel cylinder 56. The output signal pFL of the FL pressure sensor 57 is supplied to the ECU 10. The ECU 10 detects the wheel cylinder pressure $P_{W/C}$ related to the FL wheel based on the output signal pFL of the FL pressure sensor 57.

The second hydraulic path 22 extending from the master cylinder 16 is connected to a rear main cut valve 58 (hereinafter called RMCV 58). The RMCV 58 is a two-position solenoid valve which is set in a valve open state in an initial condition, and set in a valve closed state when a drive signal is supplied to the RMCV 58 by the ECU 10. Hereinafter, the condition in which the RMCV 58 is set in the valve open state with no drive signal supplied to the RMCV 58 is called the initial condition.

The RMCV 58 is connected at the other end to both a rear right connecting path 59 (hereinafter called RR connecting path 59) and a rear left connecting path 60 (hereinafter called RL connecting path 60). That is, the output of the RMCV 58 branches into the RR connecting path 59 and the RL connecting path 60.

The RR connecting-path 59 is connected to a wheel cylinder 61, and the wheel cylinder 61 is provided in a rear right (RR) wheel of the vehicle. An RR pressure sensor 62 is connected to an intermediate portion of the RR connecting path 59 adjacent to the wheel cylinder 61. The RR pressure sensor 62 outputs a signal (hereinafter called output signal pRR) indicative of a wheel cylinder pressure $P_{W/C}$ of the wheel cylinder 61. The output signal pRR of the RR pressure sensor 62 is supplied to the ECU 10. The ECU 10 detects the wheel cylinder pressure $P_{W/C}$ related to the RR wheel based on the output signal pRR of the RR pressure sensor 62.

The RL connecting path 60 is connected to a rear sub-cut valve 63 (hereinafter called RSCV 63). The RSCV 63 is a two-position solenoid valve which is set in a valve open state in an initial condition, and set in a valve closed state when a drive signal is supplied to the RSCV 63 by the ECU 10. Hereinafter, the condition in which the RSCV 63 is set in the valve open state with no drive signal supplied to the RSCV 63 is called the initial condition.

The RSCV 63 is connected to a wheel cylinder 64, and the wheel cylinder 64 is provided in a rear left (RL) wheel of the vehicle. An RL pressure sensor 65 is connected to an intermediate portion of the RL connecting path 60 adjacent to the wheel cylinder 64. The RL pressure sensor 65 outputs a signal (hereinafter called output signal pRL) indicative of a wheel cylinder pressure $P_{W/C}$ of the wheel cylinder 64. The output signal pRL of the RL pressure sensor 65 is supplied to the ECU 10. The ECU 10 detects the wheel cylinder pressure $P_{W/C}$ related to the RL wheel based on the output signal pRL of the RL pressure sensor 65.

The hydraulic brake device of the present embodiment is provided with a reservoir path 66, and the reservoir path 66 is connected to the reservoir tank 18. The atmosphere path 27 is connected through the reservoir path 66 to the reservoir tank 18. Further, the hydraulic brake device of the present embodiment is provided with a pump unit 68 and an accumulator 72. The pump unit 68 and the accumulator 72 serve as a high pressure source in the hydraulic brake device of the present invention.

The pump unit 68 has an actuating motor, an inlet port and an outlet port. The inlet port of the pump unit 68 is connected through a check valve 67 to the reservoir path 66. The output port of the pump unit 68 is connected through a check valve 69 to a high-pressure path 70.

The pump pressure path 29 extending from the mechanical pressure-increase valve 26 is connected through a check valve 71 to the high-pressure path 70. The check valve 71 is a one-way valve which allows the flow of brake fluid in the direction from the high-pressure path 70 to the mechanical pressure-increase valve 26 but inhibits the flow of brake fluid in the opposite direction. When the pressure in the high-pressure path 70 is not increased to a proper accumulator pressure Pacc, the internal pressure of the high pressure chamber 47 in the mechanical pressure-increase valve 26 is not increased to the accumulator pressure Pacc.

In such a condition, as previously described, in the mechanical pressure-increase valve 26, after the brake pedal 12 is depressed by the operator, the master cylinder pressure $P_{M/C}$ is produced in the pressure adjusting chamber 46, and the master cylinder pressure $P_{M/C}$ is supplied from the pressure adjusting chamber 46 into the pump pressure path 29. Since the check valve 71 is provided in the pump pressure path 29, it is possible to prevent the master cylinder pressure $P_{M/C}$ of the mechanical pressure-increase valve 26 from being supplied into the high-pressure path 70.

The accumulator 72 is connected to the high-pressure path 70. The accumulator 72 functions to store the accumulator pressure Pacc of the brake fluid discharged by the pump unit 68. An accumulator pressure sensor 73 (hereinafter called Pacc sensor 73) is connected to the high-pressure path 70 adjacent to the accumulator 72. The Pacc sensor 73 outputs a signal (hereinafter called output signal pACC) indicative of the accumulator pressure Pacc in the high pressure path 70. The output signal pACC of the Pacc sensor 73 is supplied to the ECU 10. The ECU 10 detects the accumulator pressure Pacc in the high pressure path 70 based on the output signal pACC of the $P_{ACC}$ sensor 73.

Further, an upper limit switch 74 (hereinafter called ULSW 74) and a lower limit switch 76 (hereinafter called LLSW 76) are connected to the high pressure path 70. The ULSW 74 outputs an ON signal when the accumulator pressure Pacc in the high pressure path 70 is above a given upper limit value. The LLSW 76 outputs an ON signal when the accumulator pressure Pacc in the high pressure path 70 is less than a given lower limit value. The output signal of the ULSW 74 and the output signal of the LLSW 76 are supplied to the ECU 10. For a duration that the ON signal is output by the LLSW 76, the ECU 10 supplies a drive signal to the actuating motor of the pump unit 68 so as to increase the accumulator pressure Pacc in the high pressure path 70. For a duration that the ON signal is output by the ULSW 74, the ECU 10 stops supplying the drive signal to the actuating motor of the pump unit 68 so as to decrease the accumulator pressure Pacc in the high pressure path 70. According to this processing, the accumulator pressure Pacc in the high pressure path 70 is maintained within a predetermined usable region.

A constant-pressure valve 78 is provided between the high-pressure path 70 and the reservoir path 66. The constant-pressure valve 78 is a one-way valve which allows the flow of brake fluid in the direction from the high-pressure path 70 to the reservoir path 66 only when the difference in the pressure between the high-pressure path 70 and the reservoir path 66 exceeds a valve-opening pressure. The constant-pressure valve 78 inhibits the flow of brake fluid in the opposite direction.

Further, an FR pressure-holding linear control valve 80 (hereinafter called LCV 80) and an FL pressure-holding linear control valve 82 (hereinafter called LCV 82) are connected to the high pressure path 70 in parallel. The LCV 80 is connected at the other end to the FR connecting path 51. The LCV 82 is connected at the other end to the FL connecting path 52. A rear pressure-increase cut valve 84 (hereinafter called RCV 84) is connected to the high pressure path 70. The RCV 84 is a two-position solenoid valve which is set in a valve closed state in an initial condition, and set in a valve open state when a drive signal is supplied to the RCV 84 by the ECU 10. Hereinafter, the condition in which the RCV 84 is set in the valve closed state with no drive signal supplied to the RCV 84 is called the initial condition.

The RCV 84 is connected at the other end to both an RR pressure-holding linear control valve 86 (hereinafter called LCV 86) and an RL pressure-holding linear control valve 88 (hereinafter called LCV 88). The LCV 86 is connected at the other end to the RR connecting path 59. The LCV 88 is connected at the other end to the RL connecting path 60.

Each of the above-mentioned LCV 80, 82, 86 and 88 are set in a valve closed state in an initial condition. In the initial condition, each of the LCV 80, 82, 86 and 88 is set in the valve closed state with no drive signal supplied to the LCV by the ECU 10. Each of the above-mentioned LCV 80, 82, 86 and 88 is set in a valve open state when a drive signal is supplied to the LCV by the ECU 10, such that the brake fluid in the high pressure path 70 is supplied into each of the FR connecting path 51, the FL connecting path 52, the RR connecting path 59 and the RL connecting path 60. In the valve open state, by allowing the flow of the brake fluid into the wheel cylinders 53, 56, 61 and 64 in such a manner, each of the above-mentioned LCV 80, 82, 86 and 88 serves to maintain the wheel cylinder pressure of the corresponding wheel cylinder at a controlled level in response to the drive signal supplied by the ECU 10.

Further, as shown in FIG. 1, the FR connecting path 51, the FL connecting path 52, the RR connecting path 59 and the RL connecting path 60 are connected to the reservoir path 66 through an FR pressure-reducing linear control valve 90 (hereinafter called LCV 90), an FL pressure-reducing linear control valve 92 (hereinafter called LCV 92), an RR pressure-reducing linear control valve 94 (hereinafter called LCV 94) and an RL pressure-reducing linear control valve 96 (hereinafter called LCV 96), respectively.

Each of the above-mentioned LCV 90, 92, 94 and 96 are set in a valve closed state in an initial condition. In the initial condition, each of the LCV 90, 92, 94 and 96 is set in the valve closed state with no drive signal supplied to the LCV by the ECU 10. Each of the above-mentioned LCV 90, 92, 94 and 96 is set in a valve open state when a drive signal is supplied to the LCV by the ECU 10, such that the brake fluid in each of the FR connecting path 51, the FL connecting path 52, the RR connecting path 59 and the RL connecting-path 60 is supplied into the reservoir path 66. In the valve open state, by allowing the flow of the brake fluid from the wheel cylinders 53, 56, 61 and 64 into the reservoir path 66 in such a manner, each of the above-mentioned LCV 90, 92, 94 and 96 serves to reduce the wheel cylinder pressure of the corresponding wheel cylinder in response to the drive signal supplied by the ECU 10.

Next, an operation of the hydraulic brake device of the present embodiment will be described.

In the hydraulic brake device of FIG. 1, when no drive signal is supplied to the solenoid valves 50, 55, 58, 63 and 84 by the ECU 10, the mechanical pressure-increase valve 26 is open to the wheel cylinders 53 and 56, and the master cylinder 16 is open to the wheel cylinders 61 and 64. As described above, when these solenoid valves are in their initial conditions, the solenoid valves 50, 55, 58 and 63 are set in the valve open state and the solenoid valve 84 is set in the valve closed state. The high pressure source (or the pump unit 68 and the accumulator 72) is separated or cut off from the wheel cylinders 61 and 64. In such a configuration, the mechanical pressure-increase valve 26 of the present embodiment can supply the boosted pressure Pb into both the wheel cylinders 53 and 56 through the front hydraulic path 28, the boosted pressure Pb being equal to the master cylinder pressure $P_{M/C}$ multiplied by the boost ratio S/s. At the same time, the master cylinder pressure $P_{M/C}$ from the master cylinder 16 is supplied to the wheel cylinders 61 and 64 through the RR connecting path 59 and the RL connecting path 60.

In the above-described condition, the mechanical pressure-increase valve 26 mechanically produces the boosted pressure Pb in the pressure adjusting chamber 46 without performing the electrical brake control, the boosted pressure Pb being equal to the master cylinder pressure $P_{M/C}$ multiplied by the boost ratio S/s. It is possible for the hydraulic brake device of the present embodiment to control the wheel cylinder pressure of the wheel cylinders 53, 57, 61 and 64 based on the master cylinder pressure $P_{M/C}$ supplied by the master cylinder 16 without performing the electrical brake control.

In the hydraulic brake device of FIG. 1, when the drive signal is supplied to each of the solenoid valves 50, 55, 58, 63 and 84 by the ECU 10, the high pressure source (or the pump unit 68 and the accumulator 72) is connected to the LCV 80, 82, 86 and 88. The mechanical pressure-increase valve 26 is cut off from the wheel cylinders 53 and 56, and the master cylinder 16 is cut off from the wheel cylinders 61 and 64. As described above, when the drive signal is supplied to each solenoid valve, the solenoid valves 50, 55, 58 and 63 are set in the valve closed state and the solenoid valve 84 is set in the valve open state. In such a configuration, the accumulator pressure Pacc from the accumulator 72 is supplied into the LCV 80, 82, 86 and 88.

In the above-described condition, the pressure-holding linear control valves 80, 82, 86 and 88 and the pressure-reducing linear control valves 90, 92, 94 and 86 are electrically controlled by the ECU 10 such that the output signals pFR, pFL, pRR and pRL of the pressure sensors 54, 57, 62 and 65 match with a target wheel cylinder pressure. This electrical brake control is called the brake-by-wire control. According to the brake-by-wire control, it is possible for the hydraulic brake device of the present embodiment to control the wheel cylinder pressure of the wheel cylinders 53, 56, 61 and 64 based on the accumulator pressure Pacc supplied by the high pressure source without using the mechanical pressure-increase valve 26.

Accordingly, in the hydraulic brake device of the present embodiment, when the electrical system is operating normally, the electrical brake control is performed by the ECU 10 so that the wheel cylinder pressure of the wheel cylinders 53, 56, 61 and 64 is controlled based on the accumulator pressure Pacc supplied by the high pressure source. When a malfunction in the electrical system is detected by the ECU 10, the wheel cylinder pressure of the wheel cylinders 53, 57, 61 and 64 is controlled based on the master cylinder pressure $P_{M/C}$ supplied by the master cylinder 16 without performing the electrical brake control. The mechanical pressure-increase valve 26 supplies the boosted pressure Pb of the pressure adjusting chamber 46 into the wheel cylinders 53 and 56, the boosted pressure Pb being equal to the master cylinder pressure $P_{M/C}$ multiplied by the boost ratio S/s. The master cylinder 16 supplies the master cylinder pressure $P_{M/C}$ directly into the wheel cylinders 61 and 64.

When a malfunction in the electrical system is detected but the high pressure source is operating normally, the internal pressure of the high pressure chamber 47 in the mechanical pressure-increase valve 26 is increased to a proper accumulator pressure Pacc. In such a condition, it is possible for the hydraulic brake device of the present embodiment to effectively supply the accumulator pressure Pacc through the pressure adjusting chamber 46 into the wheel cylinder so that the wheel cylinder exerts an adequately large braking force on the vehicle wheel. That is, the mechanical pressure-increase valve 26 supplies the boosted pressure Pb of the pressure adjusting chamber 46 into the wheel cylinders 53 and 56, the boosted pressure Pb being equal to the master cylinder pressure $P_{M/C}$ multiplied by the boost ratio S/s.

In the hydraulic brake device of the present embodiment, when the internal pressure of the high pressure chamber 47 in the mechanical pressure-increase valve 26 is not increased to a proper accumulator pressure Pacc, the internal pressure of the pressure adjusting chamber 46 is kept to be equal to the master cylinder pressure $P_{M/C}$ after the brake pedal 12 is depressed by the operator. The check valve 71 inhibits the flow of brake fluid in the direction from the mechanical pressure-increase valve 26 to the high pressure path 70 after the brake pedal 12 is depressed. It is possible for the hydraulic brake device of the present embodiment to supply the brake fluid pressure of the pressure adjusting chamber 46 through the front hydraulic path 28 into the wheel cylinders 53 and 56, the pressure of the pressure adjusting chamber 46 being equal to the master cylinder pressure $P_{M/C}$. Further, in the hydraulic brake device of the present embodiment, when the master cylinder pressure $P_{M/C}$ is produced in the pressure adjusting chamber 46 in the above-described manner, it is possible to supply the master cylinder pressure $P_{M/C}$ from the master cylinder 16 directly into the wheel cylinders 61 and 64 after the brake pedal 12 is depressed. Hence, it is possible to ensure an appropriate control of the brake fluid pressure even when the high pressure source malfunctions.

The pump unit 68 and the accumulator 72 in the above-described embodiment primarily correspond to the high pressure source in the claims. The pressure-holding linear control valves 80, 82, 86 and 88, the pressure-reducing linear control valves 90, 92, 94 and 96, the pressure sensors 54, 57, 62 and 65, and the ECU 10 in the above-described embodiment primarily correspond to the electrical system in the claims. The needle valve 39, the ball valve 41, and the valve seat 44 in the above-described embodiment primarily correspond to the flow control mechanism in the claims.

In the above-described embodiment, the mechanical pressure-increase valve 26, including the booster piston 35, the needle valve 39, the ball valve 41 and the valve seat 44, is provided. The present invention is not limited to this embodiment. For example, a spool valve may be used instead in order to perform the functions of the elements 35, 39, 41 and 44. The spool valve is movably provided between the pressuring chamber 45 and the high pressure chamber 47. The spool valve is moved relative to the housing 30 according to a difference in brake fluid pressure between the pressurizing chamber 45 and the high pressure chamber 47. The movement of the spool valve selectively makes the pressure adjusting chamber 46 open to one of the high pressure port 33 and the atmosphere port 34.

In the above-described embodiment, the drain chamber 48 in the mechanical pressure-increase valve 26 is connected through the atmosphere path 27 to the reservoir tank 18. Alternatively, the drain chamber 48 may be open to the atmosphere via the atmosphere port 34. In such a configuration, the pressure in the drain chamber 48 is always maintained at the atmospheric pressure.

Figure 3:
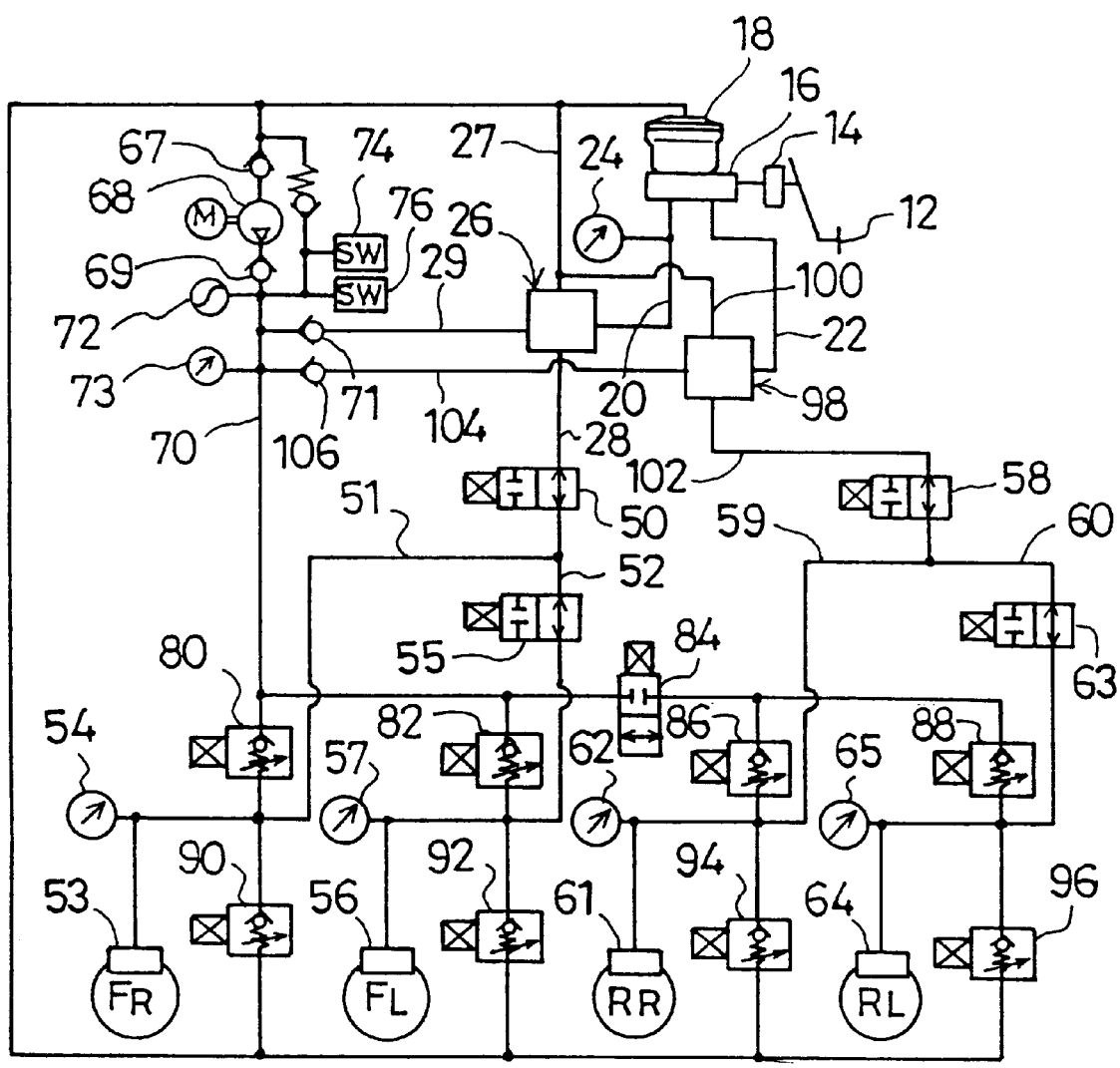
FIG. 3 is a block diagram of a second embodiment of the hydraulic brake device of the present invention.

Next, FIG. 3 shows a second embodiment of the hydraulic brake device of the present invention. In FIG. 3, the elements which are the same as corresponding elements in FIG. 1 are designated by the same reference numerals, and a description thereof will be omitted. In FIG. 3, the ECU 10 shown in FIG. 1 is omitted for the sake of convenience of illustration, but the second embodiment of the hydraulic brake device includes the ECU 10.

As shown in FIG. 3, the hydraulic brake device of the present embodiment is provided with a second mechanical pressure-increase valve 98 (hereinafter called the valve 98) in addition to the mechanical pressure-increase valve 26. The valve 98 has the same configuration as the mechanical pressure-increase valve 26 of FIG. 2. Similar to the valve 26, the valve 98 includes a master cylinder pressure port, a discharge port, a high pressure port and an atmosphere port, which are provided in a housing of the valve 98.

In the hydraulic brake device of the present embodiment, the second hydraulic path 22 extending from the master cylinder 16 is connected to the master cylinder pressure port of the valve 98. A second atmosphere path 100 extends from the atmosphere path 27 and is connected to the atmosphere port of the valve 98. Hence, the atmosphere port of the valve 98 is connected to the reservoir tank 18 through the atmosphere path 27. A rear hydraulic path 102 extends from the discharge port of the valve 98 and is connected to the RMCV 58. A second pump pressure path 104 extends from the high pressure port of the valve 98 is connected to the high pressure path 70. A second check valve 106 is provided in the second pump pressure path 104.

The second check valve 106 is a one-way valve which allows the flow of brake fluid in the direction from the high-pressure path 70 to the valve 98 but inhibits the flow of brake fluid in the opposite direction.

When the accumulator pressure Pacc from the high pressure source is properly supplied through the second pump pressure path 104 into the valve 98, the valve 98 mechanically produces a boosted pressure Pb in the pressure adjusting chamber thereof after the brake pedal 12 is depressed by the operator, the boosted pressure Pb being equal to the master cylinder pressure $P_{M/C}$ multiplied by the boost ratio S/s. The valve 98 supplies the boosted pressure Pb into the rear hydraulic path 102. The boosted pressure Pb is supplied through the rear hydraulic path 102 into the wheel cylinders 61 and 64.

When the pressure in the high-pressure path 70 is not increased to a proper accumulator pressure Pacc, the internal pressure of the high pressure chamber of the valve 98 is not increased to the accumulator pressure Pacc. In such a condition, in the valve 98, after the brake pedal 12 is depressed by the operator, the master cylinder pressure $P_{M/C}$ is produced in the pressure adjusting chamber of the valve 98, and the master cylinder pressure $P_{M/C}$ is supplied from the pressure adjusting chamber of the valve 98 into both the rear hydraulic path 102 and the second pump pressure path 104. Since the second check valve 106 is provided in the second pump pressure path 104, it is possible to prevent the master cylinder pressure $P_{M/C}$ of the valve 98 from being supplied into the high-pressure path 70.

In the hydraulic brake device of the present embodiment, when a malfunction in the electrical system is detected but the high pressure source is operating normally, both the internal pressure of the high pressure chamber 47 in the mechanical pressure-increase valve 26 and the internal pressure of the high pressure chamber in the valve 98 are increased to a proper accumulator pressure Pacc. In such a condition, it is possible for the hydraulic brake device of the present embodiment to effectively supply the accumulator pressure Pacc through the valve 26 into the wheel cylinders 53 and 56 and supply the accumulator pressure Pacc-through the valve 98 into the wheel cylinders 61 and 64 go that all the wheel cylinders 53, 56, 61 and 64 exert an adequately large braking force on the vehicle wheels. That is, the mechanical pressure-increase valve 26 supplies the boosted pressure Pb of the pressure adjusting chamber 46 into the wheel cylinders 53 and 56, the boosted pressure Pb being equal to the master cylinder pressure $P_{M/C}$ multiplied by the boost ratio S/s, and similarly the valve 98 supplies the boosted pressure Pb into the wheel cylinders 61 and 64. Accordingly, the hydraulic brake device of the present embodiment is more effective in ensuring an appropriate control of the brake fluid pressure when a malfunction in the electrical system is detected.

Figure 4:
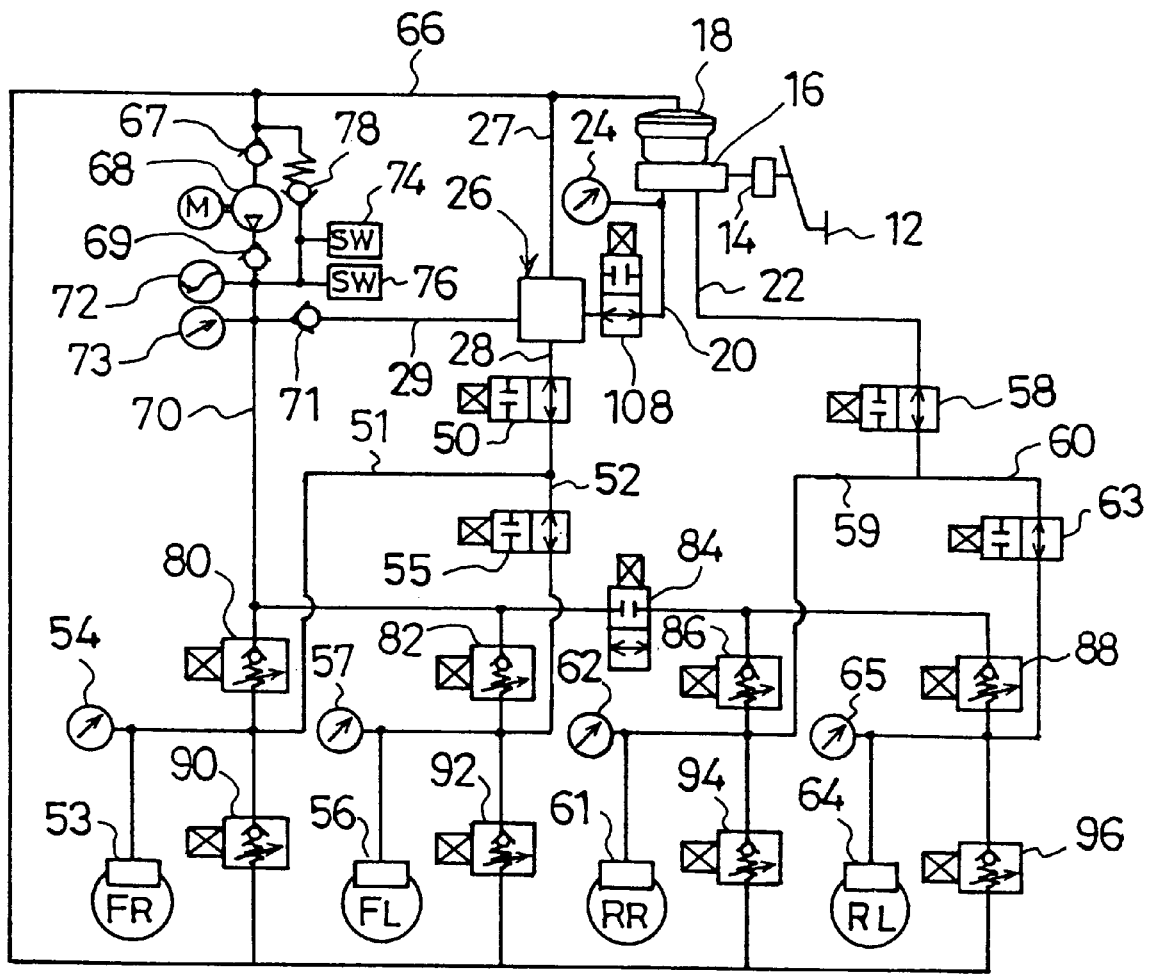
FIG. 4 is a block diagram of a third embodiment of the hydraulic brake device of the present invention.

Next, FIG. 4 shows a third embodiment of the hydraulic brake device of the present invention. In FIG. 4, the elements which are the same as corresponding elements in FIG. 1 are designated by the same reference numerals, and a description thereof will be omitted. In FIG. 4, the ECU 10 shown in FIG. 1 is omitted for the sake of convenience of illustration, but the third embodiment of the hydraulic brake device includes the ECU 10.

As shown in FIG. 4, the hydraulic brake device of the present embodiment is provided with a master cut valve 108. The master cut valve 108 is provided in the first hydraulic path 20 between the master cylinder 16 and the mechanical pressure-increase valve 26. The master cut valve 108 is a two-position solenoid valve which is set in a valve open state in an initial condition, and set in a valve closed state when a drive signal is supplied to the master cut valve 108 by the ECU 10.

Similar to the embodiment of FIG. 1, in the hydraulic brake device of the present embodiment, when the electrical system is operating normally, the electrical brake control is performed by the ECU 10 so-that the wheel cylinder pressure of the wheel cylinders 53, 56, 61 and 64 is controlled based on the accumulator pressure Pacc supplied by the high pressure source. When a malfunction in the electrical system is detected by the ECU 10, the wheel cylinder pressure of the wheel cylinders 53, 57, 61 and 64 is controlled based on the master cylinder pressure $P_{M/C}$ supplied by the master cylinder 16 without performing the electrical brake control. The mechanical pressure-increase valve 26 supplies the boosted pressure Pb of the pressure adjusting chamber 46 into the wheel cylinders 53 and 56, the boosted pressure Pb being equal to the master cylinder pressure $P_{M/C}$ multiplied by the boost ratio S/s. The master cylinder 16 supplies the master cylinder pressure $P_{M/C}$ directly into the wheel cylinders 61 and 64.

In the hydraulic brake device of the present embodiment, when the electrical system is operating normally, the master cut valve 108 is set in the valve closed state by the ECU 10 simultaneously with the start of the electrical brake control. In the valve closed state, the master cut valve 108 closes the first hydraulic path 20 so that the mechanical pressure-increase valve 26 is cut off from the master cylinder 16. In such a configuration, the master cylinder pressure $P_{M/C}$ from the master cylinder 16 is not supplied into the mechanical pressure-increase valve 26 after the brake pedal 12 is depressed. Hence, during the performance of the electrical brake control, the master cylinder pressure $P_{M/C}$ is not supplied into the mechanical pressure-increase valve 26. It is possible for the hydraulic brake device of the present embodiment to provide a longer operating life of the mechanical pressure-increase valve 26.

In the hydraulic brake device of the present embodiment, when a malfunction in the electrical system is detected by the ECU 10, the electrical brake control is not performed and the master cut valve 108 is set in the valve open state. In the valve open state, the master cut valve 108 opens the first hydraulic path 20 so that the mechanical pressure-increase valve 26 is connected to the master cylinder 16. In such a configuration, the mechanical pressure-increase valve 26 supplies the boosted pressure Pb of the pressure adjusting chamber 46 into the wheel cylinders 53 and 56, the boosted pressure Pb being equal to the master cylinder pressure $P_{M/C}$ multiplied by the boost ratio S/s. The master cylinder 16 supplies the master cylinder pressure $P_{M/C}$ directly into the wheel cylinders 61 and 64. Similar to the first embodiment of FIG. 1, it is possible for the hydraulic brake device of the present embodiment to effectively supply the accumulator pressure Pacc through the pressure adjusting chamber 46 into the wheel cylinder so that the wheel cylinder exerts an adequately large braking force on the vehicle wheel.

Further, the present invention is not limited to the above-described embodiments, and variations and modifications may be made without departing from the scope of the present invention.

The present invention is based on Japanese priority application No.9-215010, filed on Aug. 8, 1997, the entire contents of which are hereby incorporated by reference.

What is claimed is:

1. A hydraulic brake device comprising:

a master cylinder for generating a master cylinder pressure in response to a brake pedal pressure;

a high pressure source for generating an accumulator pressure higher than the master cylinder pressure;

an electrical system for electrically controlling a brake fluid pressure supplied to a wheel cylinder based on the accumulator pressure supplied from the high pressure source into the wheel cylinder;

a pressurizing chamber connected to the master cylinder for receiving the master cylinder pressure generated by the master cylinder;

a pressure adjusting chamber connected to the high pressure source for receiving the accumulator pressure generated by the high pressure source;

a booster piston movably provided between the pressurizing chamber and the pressure adjusting chamber, the booster piston being actuated in a first direction away from the pressurizing chamber by a pressure in the pressurizing chamber, and the booster piston being actuated in a direction opposite to the first direction by a pressure in the pressure adjusting chamber; and a flow control mechanism responsive to a movement of the booster piston for making the pressure adjusting chamber open to the high pressure source when the booster piston is moved in the first direction exceeding a predetermined distance, and for closing the pressure adjusting chamber to be cut off from the high pressure source when the booster piston is moved in the opposite direction back to an initial position, wherein the hydraulic brake device allows a boosted pressure in the pressure adjusting chamber to be produced based on the accumulator pressure when a malfunction in the electrical system is detected, and supplies the boosted pressure from the pressure adjusting chamber into the wheel cylinder.

2. The hydraulic brake device according to claim 1, wherein the booster piston includes a through hole provided inside the booster piston, said through hole connecting the pressurizing chamber with the pressure adjusting chamber.

3. The hydraulic brake device according to claim 2, wherein the hydraulic brake device includes a check valve provided in a brake fluid path between the high pressure source and the pressure adjusting chamber, the check valve allowing a flow of brake fluid in a second direction from the high pressure source to the pressure adjusting chamber and inhibiting a flow of brake fluid in a direction opposite to the second direction.

4. The hydraulic brake device according to claim 1, wherein the flow control mechanism includes a needle valve provided in the pressure adjusting chamber and connected to the booster piston, a ball valve connected to the needle valve, and a valve seat connected to the ball valve.

5. The hydraulic brake device according to claim 1, wherein the booster piston includes a first portion having a first cross-sectional area and a second portion having a second, smaller cross-sectional area, and the hydraulic brake device produces a boosted pressure in the pressure adjusting chamber which is equal to the master cylinder pressure multiplied by a boost ratio S/s where S is the first cross-sectional area and s is the second, smaller cross-sectional area.

6. The hydraulic brake device according to claim 1, wherein the hydraulic brake device includes a first pressure-increase valve provided for both a front right wheel cylinder and a front left wheel cylinder and a second pressure-increase valve provided for both a rear right wheel cylinder and a rear left wheel cylinder, each of the first and the second pressure-increase valves having the pressurizing chamber, the pressure adjusting chamber, the booster piston and the flow control mechanism.

7. The hydraulic brake device according to claim 6, wherein the master cylinder is connected through a first hydraulic path to the first pressure-increase valve and connected through a second hydraulic path to the second pressure-increase valve, the first pressure-increase valve being connected to both the front right wheel cylinder and the front left wheel cylinder via a front cut valve, and the second pressure-increase valve being connected to both the rear right wheel cylinder and the rear left wheel cylinder via a rear cut valve.

8. The hydraulic brake device according to claim 6, wherein the hydraulic brake device includes a first check valve provided in a first brake-fluid path between the high pressure source and the first pressure-increase valve and a second check-valve provided in a second brake fluid path between the high pressure source and the second pressure-increase valve, each of the first and the second check valves allowing a flow of brake fluid in a second direction from the high pressure source to a corresponding pressure adjusting chamber and inhibiting a flow of brake fluid in a direction opposite to the second direction.

9. The hydraulic brake device according to claim 1, wherein the hydraulic brake device includes a master cut valve provided in a brake fluid path between the master cylinder and the pressurizing chamber, the master cut valve closing the brake fluid path when the electrical system is operating normally, so that the pressurizing chamber is cut off from the master cylinder.

10. The hydraulic brake device according to claim 9, wherein the master cut valve is constituted by a two-position solenoid valve which is set in a valve open state in an initial condition and set in a valve closed state when a drive signal is supplied to the master cut valve.

11. The hydraulic brake device according to claim 1, further comprising:

a mechanical pressure-increase valve, the mechanical pressure-increase valve including the pressurizing chamber, the pressure adjusting chamber, the booster piston and the flow control mechanism, wherein a cut valve is provided in a brake fluid path between the mechanical pressure-increase valve and the wheel cylinder, and the cut valve closes the brake fluid path when the electrical system is normally operating to perform the electrical brake fluid pressure control.

12. The hydraulic brake device according to claim 1, wherein the electrical system comprises a pressure-holding linear control valve, a pressure-reducing linear control valve, a pressure sensor and an electronic control unit, the pressure-holding linear control valve being provided between the high pressure source and the wheel cylinder, the pressure-reducing linear control valve being provided between the wheel cylinder and a reservoir tank, the electronic control unit controlling the pressure-holding linear control valve and the pressure-reducing linear control valve by using the pressure sensor.

* * * * *